United States Patent [19]
Keller

[11] Patent Number: 5,345,454
[45] Date of Patent: Sep. 6, 1994

[54] ANTIRESONANT FABRY-PEROT P-I-N MODULATOR

[75] Inventor: Ursula Keller, Highlands, N.J.

[73] Assignee: AT&T Bell Laboratories, Murray Hill, N.J.

[21] Appl. No.: 10,029

[22] Filed: Jan. 27, 1993

Related U.S. Application Data

[63] Continuation-in-part of Ser. No. 788,641, Nov. 6, 1991, Pat. No. 5,237,577.

[51] Int. Cl.$^5$ ............................................. H01S 3/098
[52] U.S. Cl. ........................................ 372/12; 372/18; 372/26
[58] Field of Search .......................... 372/26, 12, 18, 11

[56] References Cited

U.S. PATENT DOCUMENTS

| | | | |
|---|---|---|---|
| 4,597,638 | 7/1986 | Chemla et al. | 350/354 |
| 4,720,309 | 1/1988 | Deveaud et al. | 148/33.1 |
| 4,860,296 | 8/1989 | Chemla et al. | 372/44 |
| 4,930,131 | 5/1990 | Sizer, II | 372/18 |
| 5,007,059 | 4/1991 | Keller et al. | 372/18 |

OTHER PUBLICATIONS

U. Keller, *IEEE Jrn. Quantum Electronics*, Oct. 1992 "Ultrafast Solid-State Mode-Locked Lasers ...".
G. Livescu, et al., "Role of Electrorefraction in Quantum-Well Fabry-Perot...", *Appl. Phys. Lett.* 60 (12) 23 Mar. 1992, pp. 1418-1420.
J. E. Cunningham, et al., "Pseudomorphic InGaAs-GaAsP Quantum-Well...", *Appl. Phys. Lett.* 60 (6), 10 Feb. 1992, pp. 727-729.
S. S. Charschan, "Laser Fundamentals", *Lasers In Industry*, Van Nostrand Reinhold Co., Chap. I, pp. 21-28 (no date).
P. Das, "Q-Switching & Mode Locking", *Lasers and Optical Engineering*, Springer-Verlag, Chap. III, pp. 240-253 (no date).
S. L. Chin, *Fundamentals of Laser Optoelectronics*, World Scientific, Series in Optics & Photonics, vol. I, pp. 232-234 (no date).
H. A. Macleon, *Thin-Film Optical Filters*, 2nd Ed. 1986, Adam Hilger Ltd., Appendix-Characteristics of Thin--Film ... pp. 509-511 (no month).
Harder et al., *Appl. Phys. Lett.*, vol. 42, No. 9, May 1, 1983 "Passive Mode Locking of Buried Heterostructure ...", pp. 772-774.
Tsang et al., *Appl. Phys. Lett.*, vol. 43, No. 4, Aug. 15, 1983, "Mode-Locked Semiconductor Lasers ...", pp. 339-341.
U. Keller et al., *Optics Letters*, vol. 15, No. 23, Dec. 1, 1990, "Coupled-Cavity Resonant Passive ...", pp. 1377-1379.
Lee et al., *Appl. Phys. Lett.*, vol. 58, No. 14, Apr. 8, 1991, "Active-Passive Mode-Locked Nd:YAG ...," 1464-66.
U. Keller et al., *Optics Letters*, vol. 16, No. 6, Mar. 15, 1991, "Coupled-Cavity Resonant Passive Mode ...", pp. 390-392.
Haus et al., *Jrnl Opt. Soc. Am.B*, vol. 8, No. 6 Jun. 1991, "Theory of Coupled-Cavity Mode Locking ... ", pp. 1252-1258.

*Primary Examiner*—James W. Davie
*Attorney, Agent, or Firm*—Gerard A. Deblasi

[57] ABSTRACT

The advantages of both active and passive modelocking techniques are realized within a single device by providing a p-i-n modulator formed at antiresonance within a Fabry-Perot etalon. The p-i-n modulator actively modulates light within the laser cavity by introducing periodic loss in response to changing voltages applied to the modulator. The p-i-n modulator includes an intrinsic region that is disposed between a p-doped region and an n-doped region. The modelocking performance of the p-i-n modulator is enhanced by the saturable absorber action of the intrinsic region.

10 Claims, 4 Drawing Sheets

ANTIRESONANT FABRY-PEROT P-I-N MODULATOR

RELATED APPLICATIONS

This application is a continuation-in-part of U.S. patent application Ser. No. 07/788,641, filed Nov. 6, 1991, entitled "Monolithically Integrated Fabry-Perot Saturable Absorber", now U.S. Pat. No. 5,237,577, issued Aug. 17, 1993.

TECHNICAL FIELD

This invention relates to p-i-n modulators and, more particularly, to such modulators utilized in the cavity of a laser for active modelocking of the laser.

BACKGROUND OF THE INVENTION

Extremely short duration optical pulses are important for high speed signal processing and communications. Optical pulses in this category are commonly called ultrashort optical pulses and have durations in the picosecond and sub-picosecond range. Ultrashort optical pulses have been obtained by techniques such as active modelocking, for example, by changing the transmission of a modulator disposed within the lasing cavity. As an alternative to active modelocking techniques, ultrashort optical pulses also have been obtained by techniques such as passive modelocking wherein a nonlinear element, such as a saturable absorber, is placed either within the lasing cavity or within a cavity external to the lasing cavity.

Active modulators, such as p-i-n modulators, actively mode-lock lasing operation by introducing periodic loss modulation to a laser cavity. Periodic loss modulation is effected by changing a voltage applied to the modulator (which is disposed within the laser cavity) to change the reflectivity of the modulator. Because the laser operates at the lowest loss state, which corresponds to the highest reflectivity of the modulator, all the axial modes of the laser are locked together when the modulator has the highest reflectivity, which then produces short pulses in the time domain.

Saturable absorbers are materials which display a change in opacity related to the incident radiation intensity at a particular wavelength. Solids, liquids, and gasses may be used as saturable absorbers based upon the chosen wavelength of operation. The saturable absorber acts as a shutter. It absorbs all weak radiation incident upon it. As the intensity of the incident radiation reaches a sufficiently high level, called the "saturation intensity" of the saturable absorber, the incident radiation is permitted to pass through the absorber. In general, the attenuation of the incident radiation caused by the saturable absorber is relatively low because the absorber is saturated into a transparent state at the wavelength for the incident radiation.

SUMMARY OF THE INVENTION

The advantages of both active and passive modelocking techniques are realized within a single device by providing a p-i-n modulator formed at antiresonance within a Fabry-Perot etalon. The p-i-n modulator actively modulates light within the laser cavity by introducing periodic loss in response to changing voltages applied to the modulator. The p-i-n modulator includes an intrinsic region that is disposed between a p-doped region and an n-doped region. The modelocking performance of the p-i-n modulator is enhanced by the saturable absorber action of the intrinsic region.

The saturation intensity and loss of a saturable absorber are substantially independently regulated by positioning the saturable absorber element, namely, the intrinsic region of the p-i-n modulator, within a Fabry-Perot etalon defined by first and second reflective elements such that the saturable absorber element responds to light at optical wavelengths in the anti-resonant portion of the Fabry-Perot spectral response. The resulting combination of elements is called an antiresonant Fabry-Perot p-i-n modulator. Thickness of the saturable absorber element substantially sets the loss of the Fabry-Perot saturable absorber while changes in the reflectivity of the first reflective element onto which the light is incident substantially determines the saturation intensity and assists in compensating loss of the saturable absorber element.

In an exemplary embodiment, a high reflectivity first reflective element is positioned on the end of the p-i-n modulator facing the incident optical radiation while a high reflectivity second reflective element (ideally 100 percent reflectivity) is positioned on the opposite end of the modulator. Dielectric material layers form the first reflective element whereas semiconductor layers form the second reflective element and the p-doped and n-doped regions of the p-i-n modulator. A plurality of quantum well and barrier layers are employed to form the intrinsic region of the p-i-n modulator.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

In copending U.S. patent application Ser. No. 07/788,641, filed Nov. 6, 1991, (now U.S. Pat. No. 5,237,577, issued Aug. 17, 1993), a Fabry-Perot saturable absorber was described for performing passive saturable absorption useful for modelocking and Q-switching of lasers. The antiresonant Fabry-Perot p-i-n modulator of the present invention, which is described in greater detail below, incorporates a pseudomorphic InGaAs-GaAsP quantum well diode into the Fabry-Perot etalon of the prior U.S. patent application. The FabryPerot p-i-n modulator is useful for active modelocking of lasers through periodic loss modulation. The performance of the active modulator is enhanced further by the saturable absorber action of the intrinsic layer of the p-i-n modulator.

Figure 1:
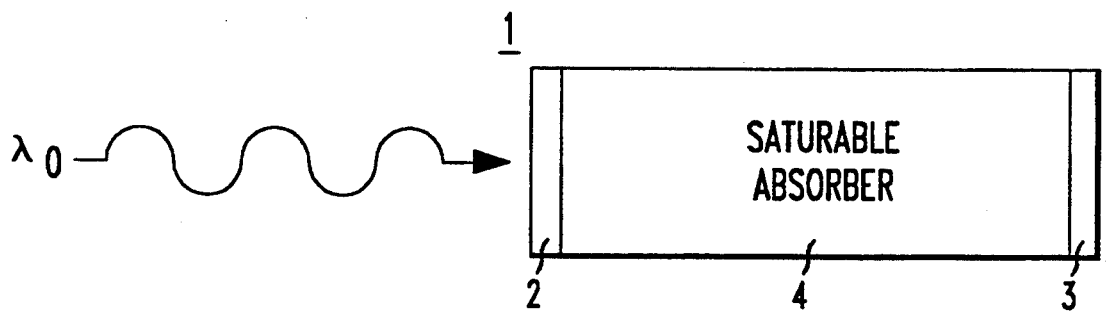
FIG. 1 shows a simplified schematic of a Fabry-Perot saturable absorber.

Fabry-Perot saturable absorber 1 as shown in FIG. 1 includes reflective elements 2 and 3 and saturable absorber element 4. The reflective elements are separated in parallel to each other to form a Fabry-Perot etalon. Light is shown incident upon the Fabry-Perot saturable absorber at reflective element 2.

Saturable absorber element 4 comprises a nonlinear material which is contemplated as being absorptive. Nonlinearity of the saturable absorber element is a function of the intensity of the incident optical radiation at or near a particular wavelength, the absorption cross-section, and the material thickness. For an absorptive nonlinearity utilized in accordance with the principles of this invention, the particular wavelength of operation is preferably in the anti-resonant band of the Fabry-Perot etalon. The anti-resonant band is understood to include the range of optical wavelengths between adjacent resonance wavelengths or resonant peak wavelengths for the Fabry-Perot etalon. By using this type of design, it is possible to achieve relaxation of thermal and other design constraints. The thickness or cross-section of saturable absorber element 4 is initially designed to set the loss at a desired value at the Fabry-Perot saturable absorber.

Figure 4:
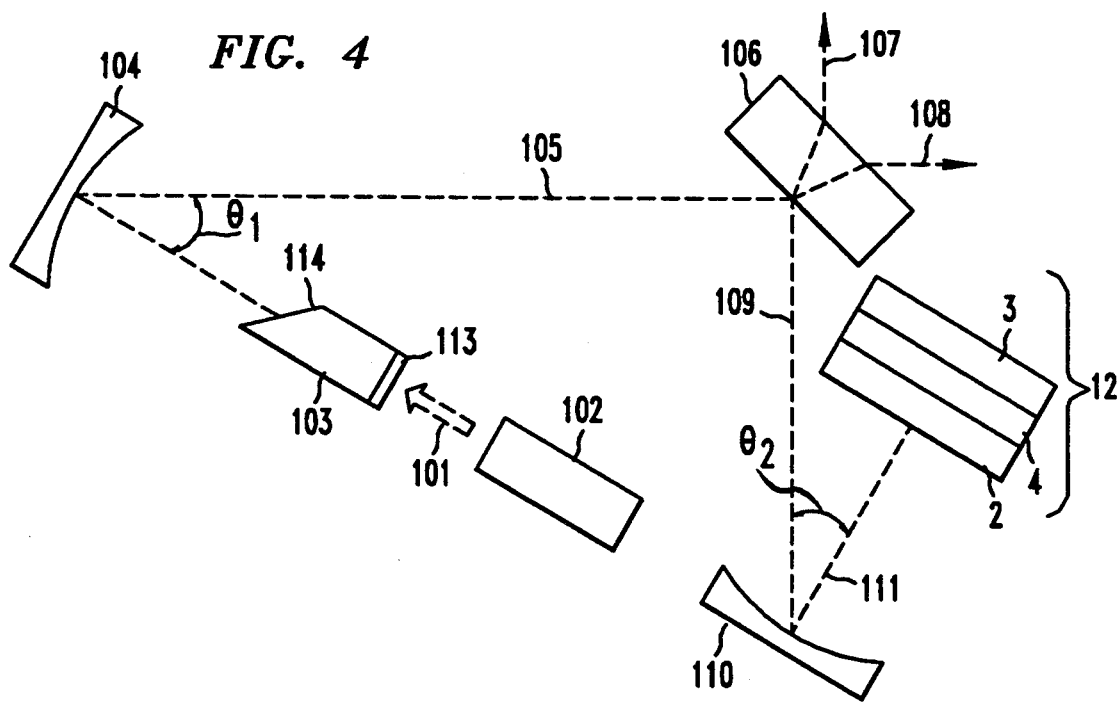
FIG. 4 shows an application of the Fabry-Perot saturable absorber to laser modelocking.

Reflective elements 2 and 3 are contemplated as dielectric or semiconductor or metallic reflectors. Reflectivities for elements 2 and 3 are contemplated as varying over a wide range of values. In most applications, reflective element 2 is the "input" for Fabry-Perot saturable absorber 1 which means that light (optical radiation) from a gain medium or a laser is incident initially upon reflective element 2. When the light is from a gain medium such as a pumped Nd:YLF crystal or the like, reflective element 2 together with another end reflective element as shown in FIG. 4 forms the laser cavity. As such reflective element 2 is required to have a reflectivity at or above 30%. In terms of the Fabry-Perot saturable absorber design, the spacing of the reflective elements and the reflectivity of reflective element 2 are important.

Spacing L of reflective elements 2 and 3 determines the resonance wavelengths or frequencies for the Fabry-Perot etalon defined therebetween. It is noted that the terms "wavelength" and "frequency" are used interchangeably without affecting the understanding of the principles of the present invention. Wavelength ($\lambda$) and frequency (f) are related by the well known equation, $\lambda = c/f$ where c is the speed of light in a vacuum. In order to determine the resonance wavelengths for the Fabry-Perot etalon, it is necessary to compute the equation $m\lambda = 2nL$ where m is an integral number, n is the effective refractive index of the saturable absorber element in the Fabry-Perot etalon and L is the reflective element spacing. The comparable equation for the resonant frequencies is given as $f = m(c/2nL)$. Separation between adjacent resonant wavelengths corresponding to m and m+1 is determined as follows, $$\Delta\lambda = \frac{\lambda^2 \Delta m}{2nL[1 - (\lambda/n)(dn/d\lambda)]},$$

where the terms are as defined previously and $\Delta m$ is the integer difference between m and m+1. This relationship is approximated for the wavelength difference between adjacent resonance wavelengths as $\Delta\lambda \approx \lambda^2/2nL$. Adjacent resonant wavelengths mark the opposite ends on the anti-resonant band of wavelengths while the extent of the anti-resonant band substantially covers $\Delta\lambda$ excluding the resonance wavelengths. Generally at the center of the anti-resonant band, the Fabry-Perot etalon has a maximum reflectivity and a round trip phase shift of an odd-integer multiple of $\pi$ wherein the phase shift includes the penetration depth of both reflective elements 2 and 3.

Figure 2:
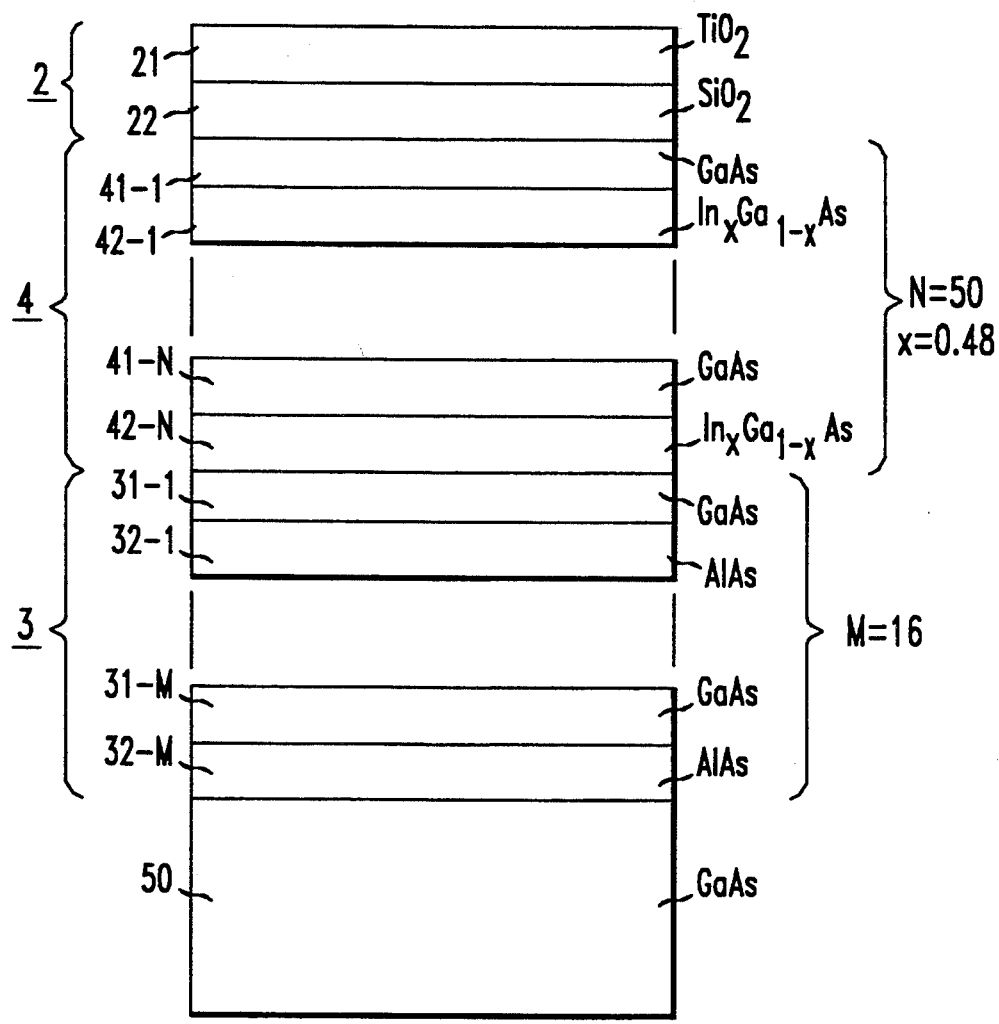
FIG. 2 depicts a cross-sectional view of a dielectric and semiconductor material layer structure for realizing the Fabry-Perot saturable absorber of FIG. 1.

An exemplary realization of the Fabry-Perot saturable absorber from FIG. 1 is shown in cross-sectional view in FIG. 2. The Fabry-Perot saturable absorber in FIG. 2 comprises a semiconductor multiple quantum well structure as saturable absorber element 4 positioned between reflective elements 2 and 3. The semiconductor multiple quantum well structure is designed to have a bandgap in the quantum well substantially at or near the wavelength of the light incident on the Fabry-Perot saturable absorber. For the example shown in FIG. 2 and described below, the bandgap of the quantum well layers is selected to correspond to 1.047 m which is the light emission wavelength for a Nd:YLF crystal laser which may be used to radiate light incident on reflective element 2 of the Fabry-Perot saturable absorber.

Saturable absorber element 4 shown in FIG. 2 comprises an InGaAs/GaAs multiple quantum well structure. Barrier layers 41-1 through 41-N consist of 48 Å thick GaAs while quantum well layers 42-1 through 42-N comprise 82 Å thick $In_xGa_{1-x}As$, where the In concentration x is approximately 0.48 to achieve the quantum well energy bandgap close to the wavelength of incident light on the saturable absorber. Them are fifty (N=50) periods of the quantum well/barrier pairs grown by epitaxial growth techniques over a semiconductor GaAs/AlAs reflector on a GaAs substrate. The number of periods employed together with the thickness of each layer determine the spacing between the reflective elements of the Fabry-Perot etalon. In accordance with the principles of the invention, the spacing is set for the wavelength of incident light, that is, the wavelength for which the saturable absorber element 4 responds, to be in the anti-resonant band of the Fabry-Perot etalon. In the example, the spacing is approximately 0.65 m. For the layer thicknesses, number of periods, energy bandgap of the quantum well layers selected, the wavelength of the incident light is near the center of the anti-resonant band substantially at the point of maximum reflectivity for the Fabry-Perot etalon between two adjacent resonance peaks of the Fabry-Perot etalon.

No intentional doping is performed on this structure although doping of the semiconductor layers is contemplated for alternative embodiments. Epitaxial growth of the quantum well structure is performed by low temperature molecular beam epitaxy (MBE) at approximately 380 C. This type of growth environment is utilized to reduce carrier lifetime and thereby achieve a relatively fast saturable absorber element 4. Carrier lifetime for the particular example described above is determined to be approximately 25 ps. Since low temperature growth increases the amount of unsaturable loss in the absorber element, it is understood that the Fabry-Perot saturable absorber as described herein exhibits less sensitivity to these unsaturable losses so that fast saturable absorber materials can be employed in the Fabry-Perot saturable absorber. While low temperature MBE has been described above for realizing an exemplary saturable absorber element, other epitaxial growth techniques such as vapor phase epitaxy, liquid phase epitaxy and standard MBE are contemplated for realizing the Fabry-Perot saturable absorber and its constituent elements.

Reflective element 3 is shown in FIG. 2 as a stack of sixteen (M=16) periods of GaAs/AlAs layer pairs. The optical thickness of each layer is substantially equal to a quarter-wave thickness ($\lambda/4n$, where n is the effective refractive index for the particular layer) at the wavelength for the incident light. In the example, the thickness of GaAs layers 31-1 through 31-M is approximately 764 Å while the thickness of AlAs layers 32-1 through 32-M is approximately 905 Å. Standard MBE growth at 640 C is performed to realize reflective element 3 on GaAs substrate 50. The reflectivity of element 3 is high, approximately 96%, for the exemplary embodiment at the wavelength of the incident light. For the embodiment shown, a high reflectivity for element 3 is preferred to avoid thermal effects from damaging the structure.

Reflective element 2 is shown in FIG. 2 as a stack of dielectric layers 21 and 22. Layers 21 and 22 are deposited $TiO_2$ and $SiO_2$, respectively, on the multiple quantum well structure of saturable absorber element 4. Reflectivity of element 2 in this example is approximately 98% at the wavelength of incident light. Techniques for depositing dielectric layers 21 and 22 and for determining the appropriate layer of thicknesses to achieve to desired reflectivity are well-known to persons skilled in the art and are not described herein. While element 2 is described in the example as comprising dielectric layers, it is understood that semiconductor layers having a similarly high reflectivity may be substituted therefor.

Figure 3:
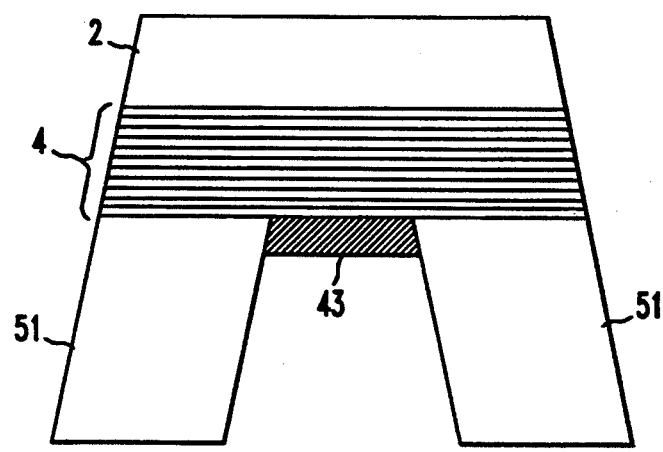
FIG. 3 is an alternative embodiment of the Fabry-Perot saturable absorber shown in FIG. 2.

An alternative embodiment of the Fabry-Perot saturable absorber is shown in FIG. 3. In this embodiment, elements 2 and 4 are understood to be as described above. Substrate 51 comprising GaAs is shown in the cross-sectional view as being etched to expose the end layer of saturable absorbable element 4. From FIG. 2, the exposed end layer is layer 42-N comprising InGaAs. In order to complete the Fabry-Perot saturable absorber structure, metallic layer 43 comprising, for example, a thin deposited or evaporated layer of gold is employed as reflector element 3.

Embodiments of the Fabry-Perot saturable absorber shown in FIGS. 2 and 3 have reflective elements monolithically integrated with the saturable absorber element. Monolithic integration of these elements prevents relative cavity length fluctuations and, therefore, optical wavelength fluctuations when the Fabry-Perot saturable absorber is used as a cavity element to mode lock a laser. Also, the monolithically integrated Fabry-Perot saturable absorber structure affords a minimum cavity length difference which, when the Fabry-Perot saturable absorber is used in conjunction with a laser gain medium, allows pulses of minimum duration to be realized.

FIG. 4 shows an exemplary laser in which the Fabry-Perot saturable absorber is combined with a gain medium and reflector to provide continuous wave (cw) modelocking and Q-switching. The laser cavity shown in FIG. 4 is an end pumped, standing wave, folded cavity. Gain medium 103 is a 5 mm Nd:YLF crystal rod having the end surface normal to the main access of the rod coated for high reflection at the lasing wavelength thereby forming reflective element 113. Antireflection coating is also applied to this end of gain medium 103 wherein the antireflection coating has a characteristic wavelength corresponding to that of being 101 from pump source 102. The opposite end of gain medium 103 is cut at the Brewster angle to form N surface 114. In this example, the lasing wavelength of gain medium 103 is approximately 1.047 m and the wavelength of pump light 101 from pump source 102 is approximately 798 nm because pump source 102 comprises a cw Ti:Sapphire laser.

Light from gain medium 103 is radiated from surface 114 to curved highly reflecting mirror 104 having a 200 mm radius of curvature. Mirror 104 is used to reduce for laser cavity mode diameter to an estimated spot size of 100 m 70 m which is small enough to ensure a low pump power threshold. Beam 105 is directed off mirror 104 toward output coupler 106. Cavity output coupler 106 comprises a flat turning mirror having a 45 degree angle of incidence and 1% transmission to provide total output coupling of 2% via output beams 107 and 108. From cavity output coupler 106, beam 109 is focused onto the Fabry-Perot saturable absorber 112 by highly reflective curve mirror 110 having a radius of curvature of approximately 100 mm. The estimated spot radius of beam 111 as reflected by mirror 110 is approximately 40 m. Fabry-Perot saturable absorber forms the other end mirror of the standing wave cavity, that is, the cavity defined by reflective elements 2 and 113. It should be noted that folding angles $\theta_1$ of approximately 16 and $\theta_2$ of approximately 12 substantially compensates astigmatism of the Brewster angle surface 114 of the Nd:YLF gain medium 103.

Fabry-Perot saturable absorber 112 is the structure previously described in relation to FIG. 2. One important benefit of the Fabry-Perot saturable absorber design is that its free spectral range, which is approximately 100 nm for the structure in FIG. 2, is significantly larger than the gain bandwidth of the Nd:YLF laser which is approximately 0.6 nm. In view of this design, the Fabry-Perot saturable absorber relaxes many design constraints in the realization of a modelocked laser and eliminates sensitivities to thermal loading.

The modelocked laser structure shown in FIG. 4 utilizing the Fabry-Perot saturable absorber is viewed as a coupled cavity structure where the main laser cavity is defined between reflective elements 2 and 113 and where the external nonlinear cavity including the saturable absorber is the Fabry-Perot saturable absorber 112. Both coupled cavities overlap interferometrically except for the saturable absorber element. This corresponds to a monolithic coupled cavity because any cavity length fluctuations in either cavity are identical in both cavities due to the presence of the Fabry-Perot saturable absorber. Cavity length detuning is minimized which, in turn, minimizes the duration of output optical pulses. As a result of the condition that the lasing wavelength of the coupled cavity is required to be both an axial mode of the main (gain medium) cavity and the wavelength for maximum reflectivity of the coupled cavity, the period of the coupled cavity structure is given as $c/2\delta L$ which corresponds to the free spectral range of a Fabry-Perot etalon having a thickness $\delta L$, where $\delta L$ is the cavity length detuning between the two coupled cavities. Fabry-Perot saturable absorber 112 corresponds to the Fabry-Perot etalon having the desired thickness $\delta L$.

When the Fabry-Perot saturable absorber is utilized in a coupled cavity mode locking laser structure, such as shown in FIG. 4, the thickness of saturable absorber element 4 is judiciously set to realize a Fabry-Perot etalon whose free spectral range is larger than the gain bandwidth of the gain medium in order to prevent pulse width limitations by the Fabry-Perot etalon. For the example shown in FIG. 4 and described above, the free spectral range of the etalon is larger than the gain bandwidth of the Nd:YLF gain medium.

For the exemplary laser embodiment shown in FIG. 4, stable, self-starting, mode locked pulses were achieved. The output pulses had a sech$^2$ pulse shape with a duration of 4 ps at a repetition rate of approximately of 220 Mhz determined by the round-trip time of the cavity. This laser structure also exhibited a self-induced Q-switching characteristic with a pulse duration of 1.4 seconds at a repetition rate of 120kHz, corresponding to the relaxation frequency of the Nd:YLF gain medium. Average output power for pulses from the laser in FIG. 4 was 480 mW in response to 1.4 W pump power from a cw Ti:sapphire laser at a wavelength of 798 nm.

Advantageously, the Fabry-Perot saturable absorber operates as a cavity saturable absorber at a particular wavelength for which it is possible to independently design the non-linearity, the loss, and the non-linearity speed (carrier lifetime) by choosing appropriate values for the reflectivity of reflective element 2, the thickness of saturable absorber element 4, and growth parameters relating to fabrication of the saturable absorber element. For example, growth temperature in an epitaxial growth process can be used to achieve a desired response time for the saturable absorber element. The desired response time corresponds to the carrier lifetime. With respect to design of the non-linearity, it is understood that for semiconductor materials the wavelength of operation determines the absorber cross-section and saturation intensity which determines the non-linearity. The capability of designing the nonlinearity or saturation intensity independently of the loss of the saturable absorber is particularly important for lasers having small gain cross-sections, such as solid-state lasers (e.g., Nd:YLF, Nd:YAG, and Ti:sapphire), where the available output power drops drastically with increased intracavity losses. Typically, only a few percent loss is acceptable.

Other contemplated embodiments of the Fabry-Perot saturable absorber which are deemed obvious in view of the description above include the use of bulk semiconductor material for the saturable element. Also, it is contemplated that a broadband saturable absorber response is provided by compositionally grading the semiconductor saturable material or, in the case of semiconductor quantum wells, by varying the bandgap energy of successive wells from wide bandgap near reflective element 2 to narrow bandgap near reflective element 3. Alternatively, the thickness of quantum well layers and/or barrier layers can be varied to provide effective grading and therefore broadband operation. These embodiments have not been shown in the FIGURES but are, after reading this specification, believed to be within the ordinary skill of persons in this field.

It is understood that, while the material system GaAs/InGaAs is described above for fabricating the saturable absorber element other material combinations may be selected from other semiconductor Group III-V systems such as GaAs/AlGaAs, InGaAs/InGaAlAs, InGaAs/InAlAs, GaAs/AlAs, GaAsSb/GaAlAsSb and InGaAsP/InP to achieve saturable absorption at different desired wavelengths. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II-VI and Group IV.

Figure 5:
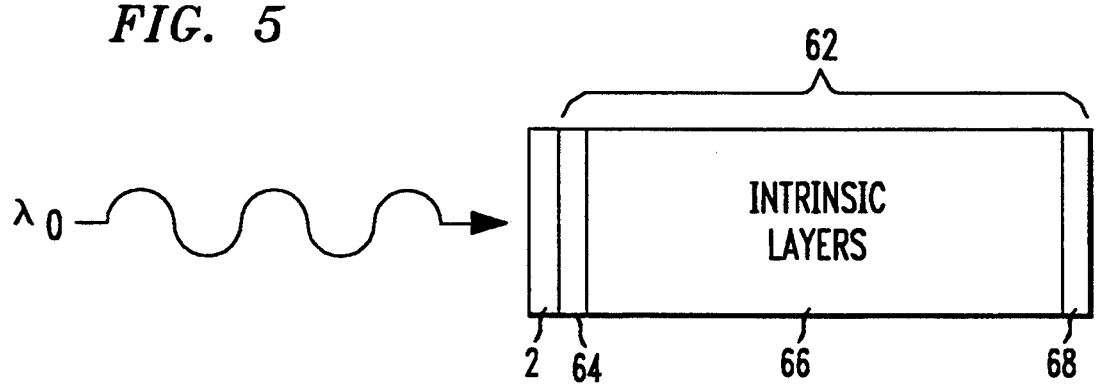
FIG. 5 shows a simplified schematic of a Fabry-Perot p-i-n modulator.

FIG. 5 shows an antiresonant Fabry-Perot p-i-n modulator constructed in accordance with the principles of the invention. The antiresonant Fabry-Perot p-i-n modulator includes reflective elements 2 and 68 which form a Fabry-Perot etalon, and a p-i-n modulator 62 formed within the Fabry-Perot etalon at antiresonance. P-i-n modulator 62 includes a p-region 64, intrinsic region 66, and an n-region 68. In this embodiment, n-region 68 is an integrated semiconductor mirror which is n-doped (and thus is also referred to as "reflective element 68"). It is to be understood, however, that the p-i-n modulator could be replaced by any other integrated modulator, such a p-n-p-n modulator, without departing from the scope of the invention. Element 2 preferably is a dielectric mirror, such as a $SiO_2/TiO_2$ mirror stack, which has a higher damage intensity than semiconductor materials.

Light is shown incident upon the Fabry-Perot p-i-n modulator at reflective element 2. P-i-n modulator 62 operates as an active modulator in a conventional manner to introduce periodic loss modulation within the laser cavity. Periodic loss modulation is effected by changing the voltage on p-i-n modulator 62 so as to change the reflectivity of the Fabry-Perot p-i-n modulator. Unlike a conventional p-i-n modulator, however, the performance of p-i-n modulator 62 is enhanced by the saturable absorber action of intrinsic region 66 and the Fabry-Perot etalon which surrounds the modulator.

Placing a p-i-n modulator inside a FabryoPerot etalon at antiresonance in accordance with the principles of the present invention provides several advantages not available in the prior art. For example, because the intensity of the radiation inside a Fabry-Perot etalon is lower than the incident radiation intensity, continuous wave saturation of the p-i-n modulator is prevented, and the performance of the modulator is improved. In other words, the Fabry-Perot etalon transforms the p-i-n modulator into a high-saturation intensity device. The reduced intensity within the Fabry-Perot etalon also increases the damage threshold of the device, particularly where the reflective element on which radiation is incident (e.g., reflective element 2 of FIG. 5) is a dielectric material. Moreover, the top reflector of the Fabry-Perot etalon reduces intracavity losses.

There are several advantages obtained by using the antiresonant Fabry-Perot p-i-n modulator of the present invention rather than a saturable absorber. For example, it is difficult to achieve self-starting mode locking at high repetition rates with a saturable absorber. However, the p-i-n modulator provides a strong starting mechanism. Once modelocking operation has started, saturable absorber action is easily started. Also, the pulsed repetition rate of the antiresonant Fabry-Perot p-i-n modulator is readily synchronized to an external reference, such as a microwave oscillator or another mode-locked laser, without adjusting the length of the laser cavity. This feature is particularly important for monolithic lasers.

Like the saturable absorber of FIG. 1, the Fabry-Perot p-i-n modulator of FIG. 5 includes a nonlinear material, namely, intrinsic region 66, which is contemplated as being absorptive. The nonlinearity of the absorptive material is a function of an applied voltage, the intensity of the incident optical radiation at or near a particular wavelength, the absorption cross-section, and the material thickness. For absorptive nonlinearlity utilized in accordance with the principles of this invention, the particular wavelength of operation preferably is in the antiresonant band of the Fabry-Perot etalon.

P-region 64 of p-i-n modulator 62 illustratively is a p-type GaAs layer. Intrinsic region 66 is a pseudomorphic InGaAs-GaAsP quantum well region. The number of quantum wells in intrinsic region layer 66 is chosen such that the device is operated at antiresonance for the lasing wavelength. Quantum well modulators suitable for use in the Fabry-Perot p-i-n modulator of the present invention can be constructed as described in Cunningham et al., "Pseudomorphic InGaAs-GaAsP Quantum Well Modulators on GaAs," *Appl. Phys. Lett.*, 60 (6), February 10, 1992, pp. 727–29. The quantum confined Stark effect in intrinsic region 66 produces a shift to longer wavelengths in the absorption response of the Fabry-Perot p-i-n modulator in response to an applied voltage, which then reduces the absorption at the lasing wavelength.

Reflective elements 2 and 68 are dielectric or semiconductor or metallic reflectors. In the embodiment of FIG. 5, reflective element 2 is a material other than semiconductor material while reflective element 68 is a GaAs/AlAs n-doped mirror. It is desirable that the reflective material on the side of the device at which light enters, e.g., reflective element 2, to be other than a semiconductor material. This produces a higher damage intensity, thus minimizing laser burning of the reflective material.

Figure 6:
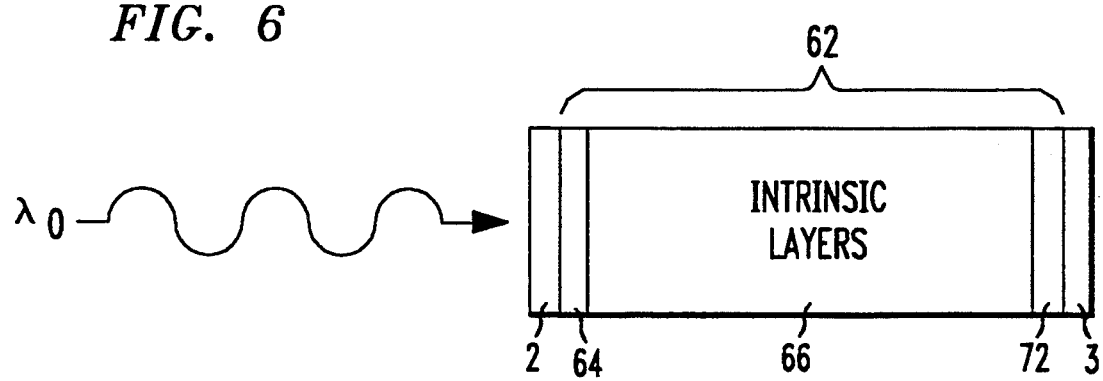
FIG. 6 shows a simplified schematic of an alternative embodiment of the Fabry-Perot p-i-n modulator of FIG. 5.

In an alternative embodiment of the invention, shown in FIG. 6, the Fabry-Perot p-i-n modulator is realized as p-i-n modulator 62 surrounded by a Fabry-Perot etalon comprising discrete reflective elements 2 and 3. P-i-n modulator 62 includes p-type GaAs layer 64, intrinsic region 66, and an n-type GaAs layer 72. Reflective element 3 and n-type GaAs layer 72 in combination provide the functionality of layer 68 of the Fabry-Perot p-i-n modulator of FIG. 5.

Figure 7:
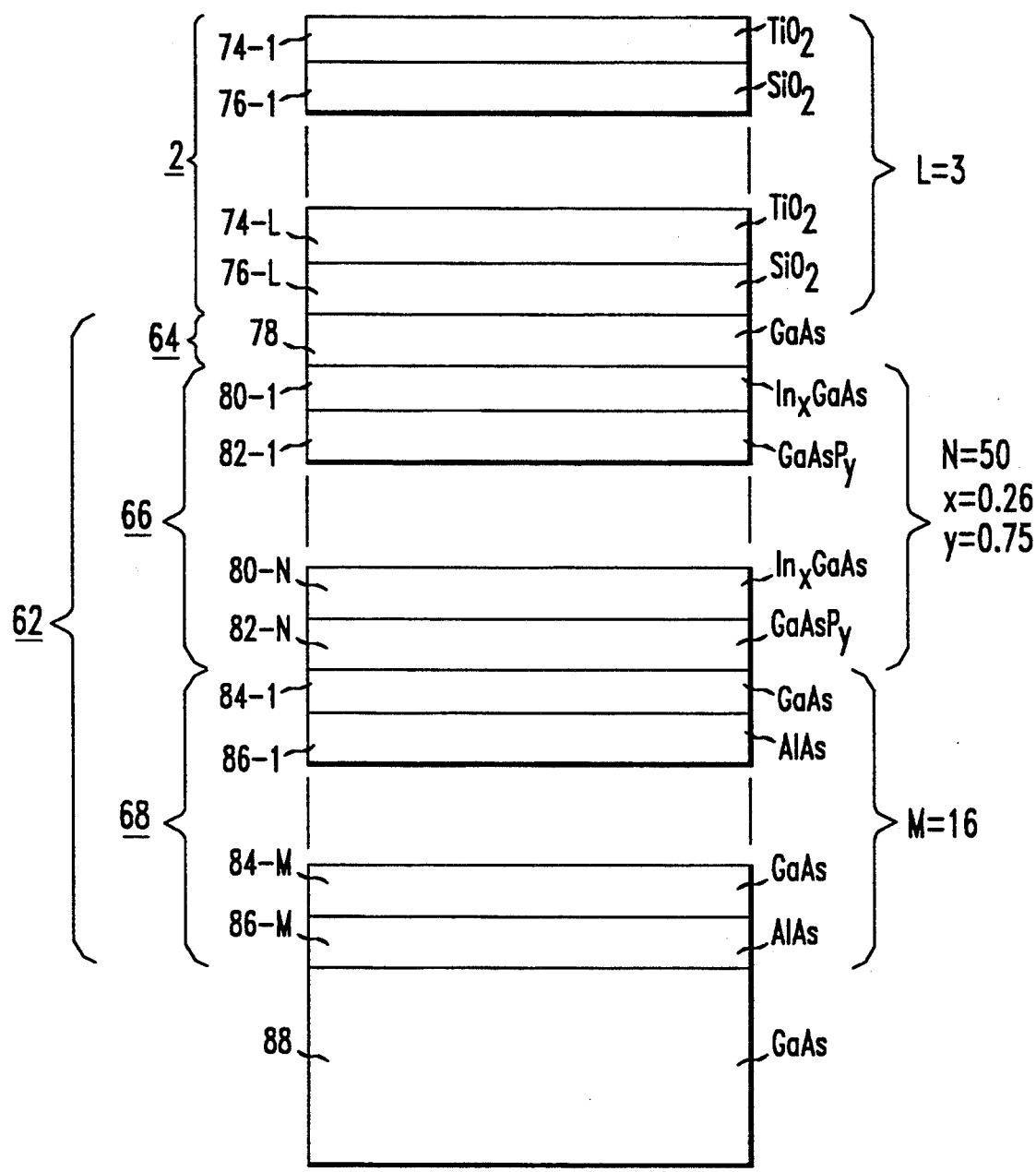
FIG. 7 depicts a cross-sectional view of a dielectric and semiconductor material layer structure for realizing the Fabry-Perot p-i-n modulator of FIG. 5.

FIG. 7 shows an exemplary dielectric and semiconductor material layer structure of the Fabry-Perot p-i-n modulator of FIG. 5. As discussed above, the layer structure includes reflective element 2 and p-i-n modulator 62 (which includes p-region 64, intrinsic region 66, and n-region 68), constructed on a substrate. Intrinsic region 66 comprises a semiconductor multiple quantum well structure that is designed to have a bandgap in the quantum well substantially at or near the wavelength of the light incident on the Fabry-Perot p-i-n modulator.

Reflective element 2 is shown in FIG. 7 as a stack of three (L=3) periods of $TiO_2/SiO_2$ dielectric layer pairs. Layers 74-1 through 74-L are layers of $TiO_2$ and layers 76-1 through 76-L are $SiO_2$. The number of layer pairs determines the reflectivity of reflective element 2. An illustrative reflectivity is 98 percent. Techniques for depositing dielectric layers 74 and 76, and for determining the appropriate layer thicknesses and number of layers to achieve to desired reflectivity, are well-known to persons skilled in the art and are not described herein. While element 2 is described in the example as comprising dielectric layers, it is understood that semiconductor layers having a similarly high reflectivity may be substituted therefor.

Layer 78, illustratively a layer of p-type GaAs, forms p-region 64 of p-i-n modulator 62. Layer 78 is deposited to a thickness of approximately 468 nm. Layer 78 is formed on layer 80-1 of intrinsic region 66.

Intrinsic region 66 comprises an InGaAs/GaAs multiple quantum well structure. Barrier layers 80-1 through 80-N consist of 80 Å thick $In_xGaAs$, where the In concentration x is approximately 0.26. Quantum well layers 82-1 through 82-N comprise 65 Å thick $GaAsP_y$, where the P concentration y is approximately 0.75. There are fifty (N=50) periods of the quantum well/barrier pairs grown by epitaxial growth techniques. As in the layer structure of the saturable absorber of FIG. 2, the number of periods employed, together with the thickness of each layer, determine the spacing between the reflective elements (i.e., elements 2 and 68) of the Fabry-Perot etalon.

In accordance with the principles of the invention, the spacing between the reflective elements of the Fabry-Perot etalon is selected such that the wavelength for which intrinsic region 66 responds is in the anti-resonant band of the Fabry-Perot etalon. For the layer thicknesses, number of periods, and energy bandgap of the quantum well layers selected, the wavelength of the incident light is near the center of the anti-resonant band substantially at the point of maximum reflectivity for the Fabry-Perot etalon between two adjacent resonance peaks of the Fabry-Perot etalon.

N-region 68 is shown in FIG. 7 as a stack of sixteen (M=16) periods of n-doped GaAs/AlAs layer pairs. In this illustrative embodiment, the thickness of each of GaAs layers 84-1 through 84-M is approximately 75 nm. The thickness of each of AlAs layers 86-1 through 86-M is approximately 89 nm. Layer 86-m is grown on a doped GaAs substrate 88.

It will be apparent to one skilled in the art that other modifications can be made to the described embodiment without departing from the scope of the invention.

What is claimed is:

1. Optical apparatus comprising:
   first and second reflective elements being spaced apart to form a Fabry-Perot etalon therebetween, the Fabry-Perot etalon being characterized by a plurality of optical frequencies each frequency corresponding to a resonant condition; and
   semiconductor material having a nonlinear optical absorption that can be varied with an applied voltage substantially at a predetermined optical frequency and being positioned between the first and second reflective elements, the predetermined optical frequency being between any two adjacent optical frequencies in the plurality of optical frequencies so that the predetermined optical frequency occurs substantially at an optical frequency corresponding to an anti-resonant condition for the Fabry-Perot etalon, the semiconductor material comprising a p-i-n modulator having a p-doped region, an intrinsic region, and an n-doped region, the intrinsic region being disposed between the p-doped and n-doped regions.

2. The invention as defined in claim 1 wherein the first and second reflective elements are monolithically integrated with the semiconductor material.

3. The invention as defined in claim 1 wherein the intrinsic region comprises:
   first layers of material having a first bandgap energy; and second layers of material having a second bandgap energy, the first bandgap energy being larger than the second bandgap energy, the first layers alternated with the second layers to form a multiple quantum well structure.

4. The invention as defined in claim 3 wherein the first layers comprise a composition of InGaAs and the second layers comprise a composition of GaAsP.

5. The invention as defined in claim 3 wherein the n-doped region and the second reflective element are integrated as a single element which comprises:
third layers of semiconductor material having an optical thickness of one-quarter wavelength at the predetermined optical frequency; and
fourth layers of semiconductor material having an optical thickness of one-quarter wavelength at the predetermined optical frequency, the third and fourth layers being alternated with each other.

6. The invention as defined in claim 5 wherein the third layers include GaAs and the fourth layers include AlAs.

7. The invention as defined in claim 5 wherein the p-region is a fifth layer comprising p-type GaAs.

8. The invention as defined in claim 7 wherein the first reflective element includes a sixth layer comprising $SiO_2$ and a seventh layer comprising $TiO_2$, the sixth layer being adjacent to the fifth layer.

9. Optical apparatus comprising:
first and second reflective elements being spaced apart to form a Fabry-Perot etalon therebetween, the Fabry-Perot etalon being characterized by a plurality of optical frequencies each frequency corresponding to a resonant condition; and
a integrated modulator positioned between the first and second reflective elements and having a nonlinear optical absorption, that can be varied with an applied voltage, substantially at a predetermined optical frequency and the predetermined optical frequency being between any two adjacent optical frequencies in the plurality of optical frequencies so that the predetermined optical frequency occurs substantially at an optical frequency corresponding to an anti-resonant condition for the Fabry-Perot etalon.

10. The invention of claim 9 wherein the integrated modulator is a p-i-n modulator having a p-doped region, an intrinsic region, and an n-doped region, the intrinsic region being disposed between the p-doped and n-doped regions.

* * * * *